United States Patent [19]

Mirossay

[11] Patent Number: 5,656,712
[45] Date of Patent: Aug. 12, 1997

[54] POLYURETHANE COMPOSITIONS AND METHOD

[76] Inventor: Thomas C. Mirossay, 4805 Hollow Tree Ct., Arlington, Tex. 76018

[21] Appl. No.: 432,834

[22] Filed: May 2, 1995

[51] Int. Cl.$^6$ .................................................. C08G 18/22
[52] U.S. Cl. ............................ 528/56; 528/905; 528/61
[58] Field of Search .................................................. 528/56

[56] References Cited

U.S. PATENT DOCUMENTS

| | | | |
|---|---|---|---|
| 3,267,078 | 8/1966 | Damusis | 427/385.5 |
| 3,621,000 | 11/1971 | Schmelzer et al. | 528/64 |
| 4,101,497 | 7/1978 | Charves et al. | 523/454 |
| 4,389,454 | 6/1983 | Horacek et al. | 428/318.6 |
| 4,391,958 | 7/1983 | Minato et al. | 525/504 |
| 4,536,557 | 8/1985 | Heyman | 528/52 |
| 4,554,299 | 11/1985 | Liggett | 523/466 |
| 4,555,561 | 11/1985 | Sugimori et al. | 528/26 |
| 4,695,618 | 9/1987 | Mowrer | 528/55 |
| 4,764,537 | 8/1988 | Horn et al. | 521/51 |
| 4,847,319 | 7/1989 | Bandlish | 524/589 |
| 5,154,764 | 10/1992 | Cells et al. | 106/310 |
| 5,214,086 | 5/1993 | Mormile et al. | 524/237 |
| 5,288,797 | 2/1994 | Khalil et al. | 524/872 |

OTHER PUBLICATIONS

Saunders & Frisch; Polyurethanes, Part II; 1964; pp. 773–775.

*Primary Examiner*—Rachel Gorr
*Attorney, Agent, or Firm*—Harold Levine, Esq.

[57] ABSTRACT

A two-component polyurethane sealant composition comprising a diisocyanate-based prepolymer as a first component and a polyol composition as a second component reactable with said first component, when said two components are admixed, to form a thermoset curable polyurethane, said polyol composition comprising a polyol capable of reacting with said diisocyanate-based prepolymer to form a polyurethane a catalyst, comprising a mixture of cobalt and vanadium alkanoates and a ketimine, and the method of making an architectural seal utilizing the same.

16 Claims, No Drawings

POLYURETHANE COMPOSITIONS AND METHOD

BACKGROUND OF THE INVENTION

The present invention relates to two component compositions capable of forming polyurethane sealants.

Polyurethanes are well known thermoplastic polymers which, as is known, can be made thermosetting. Such polymers are produced by the condensation reaction of a polyisocyanate and a hydroxyl-containing material, usually a polyol derived from propylene oxide or triclorobutylene oxide. Because of the good resistance, when cured, to abrasion, weathering, and solvents, they are utilized as sealants, caulking agents, and adhesives in a variety of uses, including architectural uses such as control and expansion joints in concrete floors, sidewalks, parking decks, industrial floors, other areas exposed to pedestrian and/or vehicular traffic, and sealing wood and metal structural components.

In making thermoset curable, polyurethane resins, it is conventional to use two component compositions in which a diisocyanate prepolymer forms one component and the polyol the second component, such polyol second component, including a catalyst or curing agent. Among the most useful curing agents are the organo-mercuro catalysts. However, the use of such mercury catalysts is undesirable because of their toxicity and potential adverse environmental impact. Also, their use is restricted by EPA regulations to exterior applications and there are possible future restrictions and even banning the use thereof.

Also, at the present time many of the compositions utilized for architectural purposes have a residual tack, which is undesirable in architectural usages, particularly since it permits debris and other matter to adhere to the polyurethane as it is curing.

A further problem with two component polyurethane thermoset curing compositions is the fact that many of them do not have a suitable pot life. In some instances the two components, when admixed, will result in a product which will cure within a very short period of time, making it unsuitable for use in construction where longer pot life is necessary when admixing large quantities of sealant that have to be applied to the structure and require a long application time.

Efforts to try to substitute other metal salts such as dibutyltindilaurate, bismuth neodecanoate, combinations of bismuth and zinc octoate, lead octoate, bismuth octoate and stannous octoate have not proven satisfactory. Mercury catalysts are selective and do not catalyze water-isocyanate reaction. Surface tack is probably due to water (atmospheric moisture) reaction with isocyanate. The result is a stoichiometric imbalance on the surface. This being the case, catalysts that catalyze the water-isocyanate reaction in addition to the polyol-isocyanate reaction should make the surface tack worse. This is the case when dibutyltindilaurate or a tertiary amine such as triethylenediamine is used.

SUMMARY OF THE INVENTION

The instant invention has overcome the problems of the prior art to provide a two component composition capable of forming thermoset curing polyurethanes having an excellent pot life and no residual surface tack after being applied.

Briefly, the present invention comprises a two component composition comprising a diisocyanate-based prepolymer as a first component and a polyol composition as a second component, said two components when admixed forming a thermoset curable polyurethane, and said polyol composition containing a polyol capable of reacting with said diisocyanate-based prepolymer to form a polyurethane, certain polyvalent metallo-organic salt catalysts as discussed below, and a ketimine.

The instant invention also comprises the method of forming an architectural seal utilizing said two component composition as hereinafter described.

DETAILED DISCUSSION

One of the components of the composition is the diisocyanate-based prepolymer. Preparation of such prepolymers is conventional and does not form a part of the instant invention. Ordinarily such prepolymers are formed by first making a basic intermediate in the form of a low molecular weight polymer with hydroxyl end groups. Such polymers can be polyesters, such as those made from ethylene glycol and adipic acid, or a polyether. Such basic intermediate is then reacted with an aromatic diisocyanate to form a pre-polymer. Such diisocyanate-based prepolymers are conventional and those are the ones that are utilized in the subject invention. The preferred isocyanate is 2,4-toluene-diisocyanate with examples of other suitable isocyanates being 80/20 blends of 2,2-toluene diisocyanate and 2,6-toluene diisocyanate, and the like.

The resultant prepolymer is thermoset cured by the utilization of the second component, a polyol composition which in accord with the instant invention also contains a catalyst and a ketimine. With respect to the polyol, it is preferred to use a propoxylated polyol with 5–10% ethylene oxide capping. Such polyols have a large primary hydroxyl content ranging from 75 to 88% in the diols and 70% minimum in the triols. They also range in molecular weight from about 250 to 6,500. These are available commercially from Olin Corporation as POLY-G polyols. For the sealants of the present invention, it is preferred to use the high molecular weight polyols, most suitably diols and triols having a molecular weight above 2,000.

An essential component of the instant invention is the utilization of a ketimine. Any ketimine can be used so long as it can cross-link, but not excessively so. It is preferred to use a polyether diamine reacted with a ketone to prepare the ketimine. Most suitable are the ketimines prepared by the reaction of diamines, such as amine-terminated polypropylene glycols with methyl isobutyl ketone. These are reacted in the presence of a material, such as toluene, to remove the water formed in the reaction. The amine-terminated polypropylene glycols are available commercially from Texaco Chemical Company and are sold under the mark "JEFFAMINE" as the D-series. Most suitable is D-400 having an approximate molecular weight of 400.

With respect to the catalyst, certain polyvalent metal salts are used such as cobalt, vanadium, and molybdenum alkanoates, such as napthenates and octoates. It is preferred to use the salts of 2-ethylhexanoate and most suitably a mixture of such salts. It is especially preferred to use a mixture of cobalt 2-ethylhexanoate and a commercially available catalyst from Mooney Chemicals, Inc., CUR-Rx. This is a catalyst consisting of mixed metal salts of 2-ethylhexanoic acid in a mineral spirits carrier containing about 3.9 to 4.1% vanadium.

With respect to proportions, the diisocyanate-based prepolymer and polyol composition are used in the usual amounts in order to enable a thermoset cure and long pot life. The optimum amounts will vary dependent upon the particular components utilized, but can be determined by routine experimentation.

With respect to the catalyst, it is used in a preferred amount of 0.05 to 0.5 parts by weight for each 100 parts by weight of the total composition formed when the two components are admixed.

As to the ketimine, it is used in an amount of 5 to 30% of the total equivalents of the hydrogen donors in the total composition, preferably about 15 to 20%.

It has been noted that when the polyvalent metal salts disclosed herein are used alone without the ketimine, a curable polyurethane is formed but with a unsatisfactory and undesirable surface tack. The ketimine is not essential or needed for a cure. However significantly, the minor amounts of the ketimine when added eliminate the problem of surface tack. Moreover, it has been noted that when the polyol component has been dried to ensure that there is no water present, that the ketimine still functions to produce a substantially tack-free seal with a long pot life. It is preferred to remove the water from both components, since it is well known that the presence of water can cause carbon dioxide to be formed during the cross-linking. Such is suitable in forming urethane foams, but not suitable in forming the sealants of the present invention.

It is known that water, if present in minor amounts, can improve the surface tack but, of course, as just has been noted, such can result in undesirable carbon dioxide production and foaming.

In addition to the essential components discussed above, commonly used components that are ordinarily added to sealants can be utilized for their usual effect and in their usual amounts. Examples are fillers and coloring agents such as carbon black, titanium dioxide, calcium carbonate, barium sulfate, and mixtures thereof; UV stabilizers such as hindered amines; antioxidants; plasticizing agents; and the like.

The diisocyanate-based prepolymer, which is one component, is formed in the conventional and well-known manner by reacting the polyol(s) and isocyanate(s). The second component is separately formed by admixing the components thereof and the two components admixed just prior to use.

While the instant composition can also be used as an adhesive, the surface tack phenomenon is not a problem in such usage. However, the long pot life of the instant composition makes it very suitable when large batches of adhesive are prepared for large scale use over an extended period of time.

The present invention will be described in connection with the following examples, which are set forth for purposes of illustration only.

EXAMPLE 1

A sealant was prepared by first forming a prepolymer component "A", and a polyol component "B" as set forth below.

The two components were then admixed and tested. It was found that the index was 105, it had a pot life of 2 hours, and that it had no surface tack (77° F./63% relative humidity) after 12 hours.

|  | Parts by Weight |
| --- | --- |
| "A" component: | |
| 1000 MW polypropylene triol | 3.61 |
| 2000 MW polypropylene diol | 19.23 |
| toluenediisocyanate | 5.58 |
| "B" component: | |
| 4000 MW polypropylene diol | 18.95 |
| 4500 MW polypropylene triol | 1.79 |
| triisopropanolamine | .56 |
| antioxidant | .05 |
| UV stabilizer | .03 |
| carbon black | .03 |
| titanium dioxide | 2.24 |
| calcium stearate coated calcium carbonate | 11.15 |
| barium sulfate | 29.94 |
| 5A molecular sieves | 2.09 |
| xylene | 4.24 |
| cobalt octoate | .023 |
| CUR-Rx | .023 |
| ketimine (MIBK/D-400) | .46 |

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A two-component polyurethane sealant composition comprising a diisocyanate-based prepolymer as a first component and a polyol composition as a second component reactable with said first component, when said two components are admixed, to form a thermoset curable polyurethane, said polyol composition comprising a polyol capable of reacting with said diisocyanate-based prepolymer to form a polyurethane, a catalyst comprising a mixture of cobalt and vanadium alkanoates, and a ketimine, said ketimine being present in an amount of 5 to 30% of the total equivalents of the hydrogen donors in the total composition.

2. The sealant composition of claim 1 wherein said prepolymer comprises the reaction product of at least one polyol and toluene diisocyanate.

3. The sealant of claim 2 wherein said polyol is a propoxylated polyol with 5 to 10% ethylene oxide capping.

4. The sealant of claim 3 wherein said polyol is a mixture of a polyether diol and a polyether triol.

5. The sealant composition of claim 1 wherein said ketimine is the reaction product of a diamine and a ketone.

6. The sealant composition of claim 5 wherein said diamine is an amine-terminated polypropylene glycol and said ketone is methyl isobutyl ketone.

7. A two-component polyurethane sealant composition consisting essentially of (a) a diisocyanate-based prepolymer as a first component, said prepolymer consisting essentially of the reaction product of toluene diisocyanate, a polyether diol and a polyether triol, and (b) a polyol composition reactable with said first component to form, when admixed, a thermoset curable polyurethane, said polyol composition comprising a polyether diol and a polyether triol capable of reacting with said prepolymer to form a polyurethane, a catalyst consisting essentially of a mixture of cobalt 2-ethylhexanoate and a composition consisting of mixed metal salts of 2-ethylhexanoic acid containing 3.9 to 4.1% vanadium, and a ketimine formed by reacting methyl isobutyl ketone and an amine-terminated polypropylene glycol.

8. The sealant composition of claim 7 wherein said catalyst is added in an amount of about 0.05 to 0.5 parts by weight for each 100 parts by weight of the total composition and said ketimine is added in an amount of about 5 to 30% of the total equivalents of the hydrogen donors in the total composition.

9. The sealant composition of claim 8 wherein said catalyst consists of equal amounts of said cobalt 2-ethylhexanoate and said mixed metal salts composition.

10. A method of forming an architectural polyurethane seal comprising admixing the diisocyanate-based prepolymer and polyol composition of claim 1 in an amount of each sufficient to form a thermoset curable polyurethane, applying said admixture to the area to be sealed, and permitting said mixture to cure by thermosetting.

11. The method of claim 10 wherein said prepolymer comprises the reaction product of at least one polyol and toluene diisocyanate and said polyol composition comprises a polyol capable of reacting with said prepolymer, a catalyst comprising a mixture of cobalt and vanadium alkanoates and a ketimine.

12. The method of claim 11 wherein said polyol is a propoxylated polyol with 5 to 10% ethylene oxide capping.

13. The method of claim 12 wherein said polyol is a mixture of a polyether diol and a polyether triol.

14. The method of claim 10 wherein said ketimine is the reaction product of a diamine and a ketone.

15. The method of claim 10 wherein said prepolymer and polyol composition consists essentially of (a) a diisocyanate-based prepolymer as a first component, said prepolymer consisting essentially of the reaction product of toluene diisocyanate, a polyether diol and a polyether triol, and (b) a polyol composition reactable with said first component to form, when admixed, a thermoset curable polyurethane, said polyol composition comprising a polyether diol and a polyether triol, and (b) a polyol composition reactable with said first component to form, when admixed, a thermoset curable polyurethane, said polyol composition comprising a polyether diol and a polyether triol capable of reaction with said prepolymer to form a polyurethane, a catalyst consisting essentially of a mixture of cobalt 2-ethylhexanoate and a composition consisting of mixed metal salts of 2-ethylhexanoic acid containing 3.9 to 4.1% vanadium, and a ketimine formed by reacting methyl isobutyl and an amine-terminated polypropylene glycol.

16. The method of claim 10 wherein said catalyst is added in an amount of about 0.05 to 0.5 parts by weight for each 100 parts by weight of the total composition and said ketimine is added in an amount of about 5 to 30% of the total equivalents of the hydrogen donors in the total composition.

* * * * *